United States Patent [19]
Dollinger et al.

[11] Patent Number: 5,443,104
[45] Date of Patent: Aug. 22, 1995

[54] ELASTOMERIC BARRIER FILMS FOR TIRES

[75] Inventors: Susan E. Dollinger, Granville, Ohio; William H. Davis, Jr., Baton Rouge, La.

[73] Assignee: The Dow Chemical Company, Midland, Mich.

[21] Appl. No.: 202,324

[22] Filed: Feb. 28, 1994

Related U.S. Application Data

[60] Continuation of Ser. No. 35,839, Mar. 23, 1993, abandoned, which is a division of Ser. No. 705,224, May 24, 1991, abandoned.

[51] Int. Cl.$^6$ ............................................ B60L 5/14
[52] U.S. Cl. .............................. 152/510; 152/DIG. 16
[58] Field of Search ............... 152/510, 511, DIG. 16; 138/126, 141, DIG. 4

[56] References Cited

U.S. PATENT DOCUMENTS

| | | | |
|---|---|---|---|
| 3,528,260 | 9/1970 | Binder | 138/126 |
| 4,128,510 | 12/1978 | Richwine . | |
| 4,202,952 | 5/1980 | Onizawa | 525/374 |
| 4,237,247 | 12/1980 | Matoba et al. . | |
| 4,346,700 | 8/1982 | Dunshee et al. | 128/155 |
| 4,616,687 | 10/1986 | Berta . | |
| 4,745,147 | 5/1988 | Honsberg . | |
| 4,822,838 | 4/1989 | Watanabe et al. | 524/178 |
| 4,874,670 | 10/1989 | Boon et al. . | |
| 4,905,734 | 3/1990 | Ito | 138/126 |
| 4,928,741 | 5/1990 | Rye et al. . | |
| 4,992,331 | 2/1991 | DeCoste, Jr. | 428/354 |
| 5,040,583 | 8/1991 | Lin et al. | 152/510 |
| 5,087,673 | 2/1992 | Watanabe et al. | 525/356 |

FOREIGN PATENT DOCUMENTS

| | | |
|---|---|---|
| 337279A2 | 5/1989 | European Pat. Off. . |
| 5104 | 1/1992 | Japan ............................. 152/510 |

OTHER PUBLICATIONS

Encyclopedia of Polymer Science and Engineering, 1986, vol. 6, pp. 494–513.

*Primary Examiner*—Geoffrey L. Knable

[57] ABSTRACT

Disclosed is at least a two-layered chlorinated polyethylene film for use as an inner liner for a pneumatic rubber substrate or a tire, with an inner layer adjacent an inner surface of the rubber substrate comprising an adhesive resin; and an outer layer consisting essentially of chlorinated polyethylene containing from about 35 to about 50% by weight chlorine, a derivative of 2,5-dimercapto 1-3,4 thiadiazole as a curative, an accelerator, an acid acceptor, and optionally containing carbon black. The film is from about 5 mil to about 30 mil in thickness, and has oxygen permeability from about 10 to about 60 cc-mil/100 sq.in.-atm-day. The film containing carbon black typically has an intermediate layer of a thermoplastic elastomer interposed between the adhesive layer and CPE layer. Further disclosed is a pneumatic rubber substrate or a tire incorporating chlorinated polyethylene films of the present invention.

2 Claims, 1 Drawing Sheet

ELASTOMERIC BARRIER FILMS FOR TIRES

This application is a continuation of the now abandoned application Ser. No. 08/035,839, filed Mar. 23, 1993, application Ser. No. 08/035,839 is a division of now abandoned application Ser. No. 07/705,224, filed May 24, 1991.

BACKGROUND OF THE INVENTION

This invention generally relates to an elastomeric barrier film as an inner liner, and to pneumatic rubber substrates and rubber tires having such elastomeric barrier film as the inner liner. More particularly, this invention relates to formulated chlorinated polyethylene film as an inner liner, and to the pneumatic rubber substrates and the rubber tires incorporating such a film as an inner liner.

Chlorinated polyethylene, particularly chlorinated polyethylene containing from about 30 to about 50 weight percent chlorine is a useful elastomeric material, and upon being sufficiently cured becomes a rubbery material having improved physical properties such as heat resistance, superior mechanical properties and the like.

It in known that cured or uncured and curable chlorinated polyethylenes (CPE) are useful as rubber materials because of improved properties, in jacketing electrical wires and in hoses because of their excellent heat and oil resistance. However, the utility of chlorinated polyethylenes as inner liners for tires as providing superior air impermeability, heat resistance and other improved mechanical properties has heretofore not yet been discovered. It was typically expected that CPE would not have adequate air impermeability or heat resistance for such an application.

Pneumatic tires generally have a rubbery elastomeric inner liner which forms the inner surface of the tire. This inner liner is designed to retard or minimize the permeation of air used to inflate the tire, and aid in maintaining the air pressure of the tire. Typically, the inner liner is composed of rubbers which are relatively impermeable to air. Such rubbers include butyl and halobutyl rubbers.

The inner liners based on rubber compositions represent the most expensive component in the tire construction. They also add weight to the tire because relatively thick inner liner coatings are generally necessary to obtain the desired degree of air impermeability. Typically, a butyl rubber liner must be 60 mils thick to provide the necessary air barrier properties.

The inner liners based on blends of butyl rubber with a natural rubber or reclaimed butyl rubber or both experience difficulty due to diffusion of gases, particularly air through the liner.

U.S. Pat. No. 4,616,687 discloses vulcanizing compositions containing from about 80% to 99% rubber material selected from butyl rubber, and halogenated butyl rubber; and 20% to 1% of a chlorinated hydrocarbon polymer having a chlorine content of from about 30% to 70% by weight of chlorine. The chlorinated hydrocarbon of this composition is selected from the group consisting of chlorinated polyisoprene having chlorine content from about 63 to 66% by weight, and chlorinated polyolefin having a chlorine content from about 30 to about 70% chlorine. However, this composition is composed predominantly of rubber material which is preferably a halobutyl rubber, and the teaching does not address the disadvantages such as cost, weight and the like associated with the use of a predominantly halobutyl rubber liner.

Accordingly, it is an object of present invention to provide an elastomeric film which can be used as an inner liner for rubber tires and which will be more economical and much lighter in weight than butyl or halobutyl rubbers or compositions containing predominantly halobutyl rubber, without losing desired properties such as air impermeability, heat resistance, mechanical properties and the like.

It is yet another object of the present invention to obtain a pneumatic rubber substrate or a tire which incorporates the elastomeric chlorinated polyethylene film of the invention, is light in weight and has the desired properties such as low temperature flexibility, ability to maintain air pressure, and heat resistance.

SUMMARY OF THE INVENTION

It has been discovered that films of certain thicknesses fabricated from cured or curable formulated chlorinated polyethylene compositions are useful as inner liners for the rubber tires because of improved air impermeability, heat resistance and good low temperature flexibility. These films, in fact, have oxygen impermeability far superior to that of halobutyl rubber of same thickness.

In one aspect, the present invention is a two-layered chlorinated polyethylene film for use as an inner liner for a rubber tire comprising an inner layer comprising an adhesive, to be located adjacent an inside surface of the rubber tire, and an outer layer consisting essentially of 100 parts of chlorinated polyethylene containing from about 35 to about 50 percent by weight chlorine; a derivative of 2,5-dimercapto-1,3,4-thiadiazole curative; an accelerator; and an acid acceptor. The outer layer, after curing is from about 5 mils to about 30 mils in thickness and has oxygen permeability from about 10 to about 60 cc-mil/100 sq.in.-atm-day.

In still another aspect, the present invention is a curable chlorinated polyethylene film containing carbon black, for use as an inner liner for a rubber tire, comprising at least two layers: an inner layer adjacent an inside surface of said rubber tire comprising a thermoplastic elastomer; and an outer layer of curable chlorinated polyethylene consisting essentially of 100 parts of CPE containing from about 35 to about 50 percent by weight chlorine; a derivative of 2,5-dimercapto-1,3,4-thiadiazole curative; an accelerator; and an acid acceptor. The outer layer, after curing is from about 8 mils to about 20 mils in thickness and has oxygen permeability from about 10 to about 40 cc-mil/100 sq.in.-atm-day.

This invention, in still another aspect, is a pneumatic rubber article comprising a rubber substrate and an inner liner of a curable chlorinated polyethylene films of the compositions described hereinabove.

DETAILED DESCRIPTION OF THE INVENTION

The invention will be more readily understood by reference to the drawings wherein.

Figure 1:
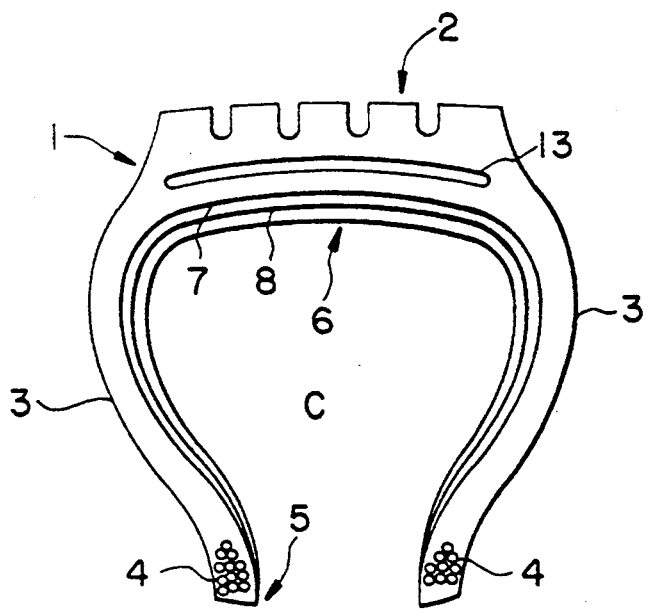
FIG. 1 is a cross-sectional view of a tire having an inner liner according to this invention.

The composition used in fabrication of the elastomeric films of this invention contains chlorinated polyethylene which can be obtained by after-chlorination of polyethylene by known methods such as by reaction of chlorine or chlorine generating agents with the polyethylene. The polyethylene can be either the low density, or a linear low density, or a high density polyethylene. Typically, the resins are prepared from high density polyethylene feedstock having a melt index of about 6.0 gms/10 minutes. Preferably, compositions with chlorinated polyethylene containing from about 20 to about 50% by weight chlorine is used. More preferably, chlorinated polyethylenes containing from about 40 to about 50% chlorine are used. Most preferred compositions are those which consist of chlorinated polyethylenes containing from about 42 to about 47% chlorine.

The crosslinking systems used to cure the composition are nonsulfur crosslinking systems formulated to cure through the chlorine functionality with dimercapto compounds such as 2,5-dimercapto-1,3,4-thiadiazole, trithiocyanuric acid, dimercaptohydantoins or dimercaptotrizole as disclosed in U.S. Pat. No. 4,128,510 or U.S. Pat. No. 4,288,576 incorporated herein by reference.

Preferably, the curing agent used is a derivative of 2,5-dimercapto-1,3,4-thiadiazole commercially available as ECHO*, a trademark of Hercules, incorporated, in amounts from about 0.75 parts to about 5 parts per 100 parts of chlorinated polyethylene. Most preferably, amount of 2,5-dimercapto-1,3,4-thiadiazole used is about 2 parts per hundred parts of chlorinated polyethylene.

Typically, the crosslinking accelerator used in this invention is a condensation product of aniline with an acyclic aliphatic mono-aldehyde such as butyraldehyde-aniline, acetaldehyde-aniline and the like.

The preferred amount of the accelerator used is from about 0.25 parts to about 2.0 parts per 100 parts of chlorinated polyethylene. Most preferably, butyraldehyde-aniline, sold under the name BEUTENE*, a trademark of Uniroyal Chemical Company, Inc., in amounts of about 0.8 parts per 100 parts of chlorinated polyethylene is used.

The acid acceptor used in this invention is selected from the group consisting of the oxides, hydroxides, carbonates, borates of a metal of Group II of the Periodic Table of Elements. Preferably, the compounds of metals such as magnesium, calcium, and barium may be used. Most preferably, magnesium hydroxide is used both as an acid acceptor and as a stabilizer for processing stability and improved long-term high heat exposure. The preferred amounts of magnesium hydroxide used are from about 2 to about 10 parts per hundred parts of chlorinated polyethylene. Most preferably, about 5 parts of magnesium hydroxide per hundred parks of chlorinated polyethylene are used in the formulation of the composition of this invention.

The compositions of this invention may further contain various additives known in the art, such as, antioxidants, pigments, fire retardants, adhesives, and processing aids such as DYNAMAR* PPA 790, a trademark of 3M Company.

Carbon black may optionally be used as an additive in amounts from about 20 parts to about 50 parts per 100 parts of chlorinated polyethylene. The use of carbon black imparts abrasive resistance to the film and enhances the air impermeability of the film. However, the use of carbon black adversely affects the low temperature flexibility of the film which is a prerequisite for proper functioning of the inner liner film. This can be circumvented by laminating or coextruding the carbon black containing chlorinated polyethylene film of the present invention with an elastomeric layer.

Preferably, the film containing carbon black will be a multi-layered film having a core barrier layer of elastomeric chlorinated polyethylene of the present invention, an inner most adhesive layer adjacent the inside surface of the rubber substrate and an intermediate elastomeric layer interposed between the core layer and the adhesive layer.

The inner most adhesive layer will suitably comprise adhesive resins which are curable and well suited for the curing process that takes place when the inner liner is incorporated into the tire. Preferably, the adhesive resin is selected from a group consisting of styrenic block copolymers, such as styrene-butadiene copolymers, and styrene-isoprene copolymers: and ethylene-vinyl acetate copolymers (EVA); or a blend of EVA and styrenic block copolymers. Any suitable curable adhesive which has the required ability to prevent delamination of the liner from the tire under the normal operating conditions of the tire can also be used.

The intermediate layer will comprise a thermoplastic elastomer selected from styrenic block copolymers as described hereinabove. The layer containing the thermoplastic elastomer may act as an adhesive layer on curing of the film, thereby eliminating the need for the innermost adhesive layer. The film may optionally have an outermost layer, adjacent the barrier layer, which is preferably but not essentially identical to the thermoplastic elastomer of the intermediate layer.

The chlorinated polyethylene films of this invention may be produced by first mixing the above described components using a Banbury internal mixer, two-roll mill, extrusion mixing device, or other conventional continuous or semi-continuous mixing techniques known in the industry. The pre-mixed compound may (or may not) then be sheeted out on a roll mill to further homogenize the composition. During these processes, the temperature must be kept between 200°–250° F. to prevent premature curing or scorching. A rubber calender is then used to fabricate the homogenized compound into a thin sheet of the desired thickness. An uncured calendered chlorinated polyethylene sheet is thus obtained.

Alternatively, the uncured or curable chlorinated polyethylene films of this invention may be fabricated by mixing and homogenization of the components of the formulation in a single-screw rubber extruder, twin-screw extruder, or other continuous mixing device at temperatures which allow for good mixing without causing premature curing or scorching. The homogenized mixture may then be fabricated through a conventional sheeting die into an uncured or curable CPE film.

Adhesion of the CPE film to the tire under operating conditions is essential to prevent delamination thereof which would lead to undesirable properties such as: 1) poor low temperature properties such as crack formation, 2) development of flat spots in the tire, and 3) non-uniform heating of the tire resulting in an uneven heat build-up in different regions of the tire which could result in the blow-up of tires. Normal operating conditions involve considerable flexure and a broad range of temperature variations.

To achieve an improvement in the adhesion of uncured CPE film to the tire, the films of the present invention will have an inner adhesive layer adjacent the inner surface of the rubber substrate. The adhesive layer will suitably comprise adhesive resins which are curable and well suited for the curing process that takes place when the inner liner is incorporated into the tire. Preferably, the adhesive resin is selected from a group consisting of styrenic block copolymers, such as styrene-butadiene copolymers, and styrene-isoprene copolymers; and ethylene-vinyl acetate copolymers (EVA); or a blend of EVA and styrenic block copolymers.

The adhesive layer is applied to the uncured chlorinated polyethylene sheet obtained as described hereinabove either through coextrusion techniques using feedblock or multimanifold die technology, or through secondary lamination or coating process.

Referring to the Figures, FIG. 1 shows a cross-sectional view of a tire having an inner liner of this invention wherein the tire is generally shown at 1, internal space of the tire at C, the tread portion at 2, a reinforcing belt is shown at 13 (as would be used in a bias belted or radial tire), a sidewall at 3, an annular bead at 4 and the inner liner generally by 6, a reinforcing body ply (not shown) extending from one annular bead to the other. The inner liner 6 is made up of an outer CPE layer 8 of the invention, and an inner adhesive layer 7 and extends from one annular bead 4 to the other, preferably ending in the region of the bead at 5.

Figure 2:
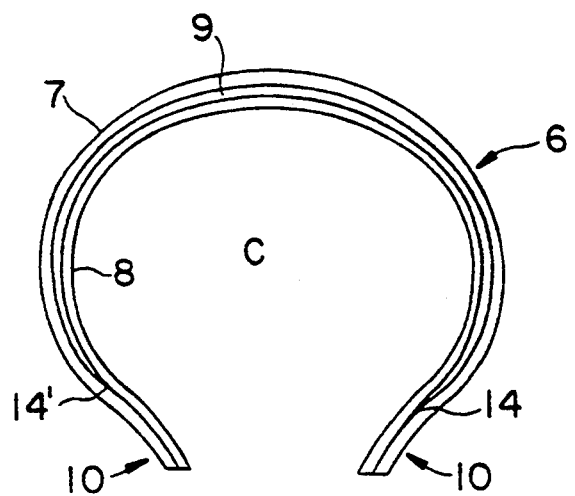
FIG. 2 is a cross-sectional view of one of the embodiments of the inner liner of this invention.

FIG. 2 illustrates one of the embodiments of the inner liner made from CPE film containing carbon black having a core barrier layer of CPE 8, an innermost adhesive layer 7 adjacent the inner surface of the tire carcass and an intermediate elastomeric layer 9 interposed between said adhesive layer 7 and said CPE layer 8 extending from 14 to 14' in the inner liner 6 which terminates at points 10. Another embodiment of the inner liner made from CPE film containing carbon black, may optionally have an outermost elastomeric layer (not shown), adjacent the barrier layer 8 disposed towards the internal space C of the tire.

The uncured multi-layered chlorinated polyethylene film containing carbon black is prepared either through coextrusion techniques using feedblock or multimanifold die technology, or through secondary lamination or coating process.

The inner liners or the uncured and curable laminated chlorinated polyethylene films of the present invention are incorporated into the tire by well known tire assembly procedures. The inner liner is cured when the vulcanization of the tires is carried out. During the curing process, the outer layer containing chlorinated polyethylene is stretched out to a thickness from about 5 mils to about 30 mils. The inner liner can be independently cured if desired.

The films or liners on curing become crosslinked which results in improvement in the properties such as elasticity, resiliency, compression set, dimensional stability, solvent resistance, and barrier properties, all of which are crucial to the proper functioning of the tires.

This invention is illustrated by the following examples in which parts are given in weight per hundred parts of chlorinated polyethylene.

EXAMPLE 1

One hundred parts of chlorinated polyethylene, commercially available as TYRIN* a Trademark of The Dow Chemical Company containing 42% of chlorine by weight were combined with, 2 parts of a derivative of 2,5-dimercapto-1,3,4-thiadiazole commercially available as ECHO* a Trademark of Hercules Incorporated, 5 parts of magnesium hydroxide commercially sold as STAN MAG* a trademark of Harwich Chemical Corporation, 0.8 parts of an accelerator butyraldehyde-aniline sold under the name BEUTENE*, a trademark of Uniroyal Chemical Company, Inc. and 0.5 parts of a processing aid commercially available as DYNAMAR* PPA 790, a trademark of 3M Company in a container and mechanically mixed. The processing aid facilitates removal of the film from the mold. The mixture was thoroughly homogenized in a BR Banbury internal mixer. The mixing was allowed to continue until the temperature reached 220° F.

The homogenized mixture was then sheeted out on a cool 6"×13" two-roll mill. A thick non-uniform sheet commonly known as a "thick blanket" was first produced which was run through the mill three times to homogenize and stretch it further.

Curing of these sheets was accomplished by using compression molding techniques using a 100 ton hydraulic press, at 320° F. at a pressure of 28–30 tons for 20 minutes. The films were stretched to a desired thickness during the curing process.

Oxygen permeability of the sample was measured on an OxTran 1050 permeability tester at 23° F. according to ASTM 3985.

Low temperature flexibility was determined with the environmental Instron at −40° C. by using 4"×4" squares of film. The Instron jaw span was set to 3" for easy loading of the sample. This allowed for ½" of the sample to be placed into the top jaws and ½" into the bottom jaws. The samples were given several minutes to equilibrate at −40° C. before subjecting them to cycling process. Each cycle consisted of the jaw span being closed to ¾" and opening again to the 3" span. This was accomplished using the extension cycle feature of the Instron. Frequency of the test was 4.25 cycles per minute. Each sample was allowed to run for 4 hours (1000 cycles) or until fracture occurred. Results are shown in Table 1 below.

EXAMPLE 2

Example 1 was repeated except chlorinated polyethylene containing 46.5% by weight of chlorine was used. The chlorinated polyethylene used was prepared by known methods with the results again shown in Table 1.

EXAMPLES 3 AND 4

Examples 1 and 2 were repeated in generally the same way except 40 parts per hundred parts of chlorinated polyethylene, of carbon black N 650, commercialized by Sid Richardson Carbon and Gasoline Company, having a particle size in the range of 49'60 nanometers were mixed and thoroughly homogenized with the composition in the Banbury internal mixer, before the mixture was sheeted out. The results are summarized in Table 1.

EXAMPLE 5 AND 6

To illustrate improved low temperature flexibility of chlorinated polyethylenes by lamination with rubbery skin layers, the cured films of examples 3 and 4 were laminated between two 10 mils thick films of ELVAX 3190, Trademark of E. I. Dupont de Nemours & Co., Inc., by compression molding press at 250° F. and pressure of 3 tons for two minutes. The EVA/CPE/EVA laminates were then tested for low temperature flexibility using the conditions described hereinabove. The results are summarized in Table 1.

Specifically, oxygen permeability values and low temperature flexibility results of the six films or Examples 1-6, about 12 mil in thickness, along with those for butyl rubber (60 mil thick) are illustrated in Table I.

TABLE 1

| Sample | Thickness (mils) | Oxygen Transmission Rate (*) | Normalized Oxygen Permeability (**) | Low Temperature Flexibility at −40° C. |
|---|---|---|---|---|
| Butyl rubber Example 1 | 60 | 3.05 | 183 | Passed |
| With No Carbon Black Example 2 | 12.5 | 3.04 | 38 | Passed |
|  | 11.4 | 3.28 | 37 | Passed |
| With No Carbon Black Example 3 | 11.1 | 4.70 | 52 | Passed |
|  | 11.8 | 4.20 | 50 | Passed |
| With Carbon Black Example 4 | 11.6 | 2.83 | 33 | Failed |
|  | 12.3 | 3.03 | 37 | Failed |
| With Carbon Black Example 5 | 8.5 | 2.83 | 24 | Failed |
|  | 9.8 | 2.62 | 26 | Failed |
| EVA/Film of Ex. 3/EVA Example 6 | 12.2 | 2.87 | 35 | Passed |
| EVA/Film of Ex. 4/EVA | 16.6 | 1.51 | 25 | Passed |

*cc/100 sq. in.-atm-day
**cc-mil/100 sq. in.-atm-day

EXAMPLE 7

An experiment was conducted to illustrate improvement in adhesion of uncured chlorinated polyethylene films of this invention to a tire carcass compound when such films were laminated with different adhesive compositions.

Twenty mil plaques of the uncured tire carcass compound were molded in a compression molding press. Twenty mil plaques of uncured chlorinated polyethylene formulation of Example 2 and different adhesive compositions were also molded in a compression molding press using varying conditions depending upon the particular adhesive composition used. A fine mesh cloth backing was applied to the outer surface of both the tire carcass compound and the laminated chlorinated polyethylene film (laminate). This is necessary to prevent stretching of the compositions during adhesive bonding tests. The tire carcass compound and the laminate were sandwiched together with adhesive layer facing the tire carcass compound, and molded in compression molding press at 275° F. and pressure of 0 tons for 10 minutes.

The adhesion strength of these laminates was tested by cutting the molded plaques into ½" wide strips. The strips were then placed in an Instron tensile tester and pulled apart using a 180 degree peel test at a rate of 200 mm/minute. The adhesion strength reported in lbs/in width of the tire compound is illustrated in Table II.

TABLE II

| | Sample | Adhesion to tire carcass compound (lb/in width) | Adhesion to Film of Example 2 (lb/in width) |
|---|---|---|---|
| Control | CPE Films of Example 2 | 2.5 | Inseparable |
| S-B/ Film of Ex. 2 | STEREON¹ 841 A styrene-butadiene copolymer (S-B) | 13.8 | 8.8 |
| EVA/ Film of Ex. 2 | ELVAX² 3190 ethylene-vinyl acetate copolymer (EVA) | 7.0 | 11.8 |

[1] Trademark of The Firestone Synthetic Rubber & Latex Co.
[2] Trademark of E.I. DuPont de Nemours & Co., Inc.

What is claimed is:
1. A pneumatic rubber tire comprising:
   a chlorinated polyethylene film as an inner liner adhered to inside surface of said tire, comprising:
   i) an inner layer adhered to an inside surface of the rubber tire, comprising an adhesive resin selected from a group consisting of styrenic block copolymers, ethylene-vinylacetate copolymers, and blends thereof, wherein said adhesive resin is capable of maintaining adhesion under normal operating conditions; and
   ii) an outer layer consisting essentially of:
      (1) 100 parts of chlorinated polyethylene containing from about 40 to about 50 percent by weight chlorine;
      (2) from about 0.75 to about 5.0 parts per 100 parts of chlorinated polyethylene, of a derivative of 2,5-dimercapto-1,3,4 thiadiazole curative;
      (3) from about 0.25 to about 2.0 parts butyraldehyde-aniline per 100 parts of chlorinated polyethylene; and
      (4) from about 2.0 to about 10.0 parts magnesium hydroxide per 100 parts of chlorinated polyethylene;
   wherein said outer layer, being cured on heating said film, is from about 5 mils to about 20 mils in thickness and having oxygen permeability from about 10 to about 50 cc-mil/100 sq.in.-atm-day.
2. A pneumatic rubber tire comprising:
   a chlorinated polyethylene film as an inner liner comprising at least two layers:

i) an inner layer adhered to an inside surface of said rubber tire comprising a styrenic block copolymer;

ii) an outer layer consisting essentially of:
(1) 100 parts chlorinated polyethylene containing from about 35 to about 50 percent by weight chlorine;
(2) from about 0.75 to about 5.0 parts per 100 parts of chlorinated polyethylene, of a derivative of 2,5-dimercapto-1,3,4-thiadiazole curative;
(3) from 0.25 to about 2.0 parts butyraldehyde-aniline per 100 parts of chlorinated polyethylene;
(4) from about 2.0 to about 10.0 parts magnesium hydroxide per 100 parts of chlorinated polyethylene; and
(5) from about 40 parts to about 50 parts per 100 parts of chlorinated polyethylene of carbon black;

wherein said outer layer being cured on heating said film, is from about 8 mils to about 25 mils in thickness having oxygen permeability from about 10 to about 40 cc-mil/100 sq.in.-atm-day.

* * * * *